United States Patent
Kim et al.

(10) Patent No.: US 9,406,961 B2
(45) Date of Patent: Aug. 2, 2016

(54) METHOD FOR PREPARING ELECTROLYTE FOR VANADIUM REDOX FLOW BATTERY USING VANADIUM OXIDE

(71) Applicant: NEW WELL CO., LTD., Yuseong-gu, Daejeon (KR)

(72) Inventors: Bu Gi Kim, Daejeon (KR); Seung Joo Lee, Daejeon (KR)

(73) Assignee: NEW WELL CO., LTD., Daejeon (KR)

( * ) Notice: Subject to any disclaimer, the term of this patent is extended or adjusted under 35 U.S.C. 154(b) by 302 days.

(21) Appl. No.: 14/015,292

(22) Filed: Aug. 30, 2013

(65) Prior Publication Data

US 2015/0056525 A1 Feb. 26, 2015

(30) Foreign Application Priority Data

Aug. 26, 2013 (KR) .................. 10-2013-0101115

(51) Int. Cl.
 *H01M 8/18* (2006.01)
(52) U.S. Cl.
 CPC ...... *H01M 8/188* (2013.01); *H01M 2300/0005* (2013.01); *Y02E 60/528* (2013.01)

(58) Field of Classification Search
CPC combination set(s) only.
See application file for complete search history.

(56) References Cited

U.S. PATENT DOCUMENTS

2001/0028977 A1\* 10/2001 Kazacos et al. .............. 429/105

\* cited by examiner

*Primary Examiner* — Ula C Ruddock
*Assistant Examiner* — Tony Chuo
(74) *Attorney, Agent, or Firm* — Rothwell, Figg, Ernst & Manbeck, P.C.

(57) ABSTRACT

According to the method for preparing an electrolyte for a vanadium redox flow battery, one electrolyte can be used as both the positive electrolyte and the negative electrolyte, by preparing an electrolyte having a median oxidation number of electrolytes used for the positive electrode and the negative electrode of the vanadium redox flow battery. Particularly, since the mixed electrolyte having the median oxidation number is separated into the same amounts of positive electrolyte and the negative electrolyte at the time of charging and discharging, the maximum charging and discharging effect based on the supplied capacitance can be obtained.

10 Claims, 2 Drawing Sheets

US 9,406,961 B2

METHOD FOR PREPARING ELECTROLYTE FOR VANADIUM REDOX FLOW BATTERY USING VANADIUM OXIDE

CROSS REFERENCE TO RELATED APPLICATIONS

This application claims priority from Korean Patent Application No. 10-2013-0101115 filed on Aug. 26, 2013, all of which is incorporated herein by reference in its entirety for all purposes.

BACKGROUND OF THE INVENTION

1. Field of the Invention

The present invention relates to a method for preparing an electrolyte for a vanadium redox flow battery using vanadium oxide, and more particularly, to a method for preparing an electrolyte, in which, when a vanadium electrolyte capable of being supplied to both a positive electrode and a negative electrode of the vanadium redox flow battery is prepared, vanadium in the +3 oxidation state ($V^{3+}$) and vanadium in the +4 oxidation state ($V^{4+}$) are mixed in the same proportions to prepare a vanadium electrolyte having a median oxidation number therebetween, thereby maximizing battery efficiency based on the supply capacitance; and the voltage difference between the produced electrolyte and a reference electrolyte having a desired oxidation number is confirmed in real time, thereby rapidly controlling the mixture ratio of the vanadium in the +3 oxidation state ($V^{3+}$) and vanadium in the +4 oxidation state ($V^{4+}$) and thus simplifying an oxidation number checking procedure and shortening the preparing time, so that an electrolyte having a desired oxidation number can be rapidly prepared and the price competitiveness of products can be improved.

2. Description of the Prior Art

A redox flow battery is one of the core products, which are closely associated with energy revolution, renewable energy, greenhouse gas reduction, rechargeable batteries, and smart grids, and have currently attracted a greatest interest over the world.

Most of current energy is obtained from fossil fuel, but the use of this fossil fuel has a serious negative effect on the environment, such as air pollution, global warming, and acid rain. Moreover, this fossil fuel has low energy efficiency.

In order to solve the problems due to the use of the fossil fuel, the interest in renewable energy is rapidly increasing and researches on the renewable energy have been actively conducted in Korea as well as around the world, in recent years.

It is said that markets of the renewable energy have entered a mature stage at home and abroad. However, due to the nature of renewable energy, the generation amount of renewable energy largely varies depending on changes in environmental factors such as time and weather. Thereby, Energy Storage Systems (ESSs) storing the generated renewable energy need to be very urgently distributed. Redox flow batteries have gained attention as a large-capacity energy storage system.

An electrolyte of the redox flow battery employs a material having a redox couple. The electrolyte of the initial redox battery was used by applying redox couples of different materials to a positive electrode and a negative electrode, respectively. However, there may be a cross contamination phenomenon in which materials ionized during charging and discharging cross each other through a separator, causing capacitance reduction.

Therefore, it was supposed that vanadium could be used for both the positive electrode and the negative electrode in order to minimize the ion cross contamination, and thereby the application of vanadium to the electrolyte leads to a high electrical voltage, and a long use lifespan and thus long-term use.

That is, a vanadium redox flow battery (VRFB) incurs little consumption of materials since, during charging and discharging, the oxidation number of vanadium varies while a vanadium active material circulates a positive electrode and a negative electrode. In addition, the VRFB has been rated as the best secondary battery energy storage system (ESS) since it has the longest lifespan among secondary batteries and is advantageous for high capacity; the electrolyte can be separated and reused through an electrochemical reaction of charging and discharging even when a positive electrolyte and a negative electrolyte are mixed passing through a membrane, thereby lowering the maintenance cost.

As for the VRFB, a vanadium electrolyte used in the positive electrode and the negative electrode needs a vanadium compound having an oxidation number of +4 for the positive electrode and +3 for the negative electrode based on a complete discharge state, and needs a vanadium compound having an oxidation number of +5 for the positive electrode and +2 for the negative electrode based on a complete charge state. Therefore, the charging and discharging reaction occurs while the oxidation number of the vanadium active material varies, and it is preferable to prepare a positive electrode and a negative electrolyte to have accurate oxidation numbers in order to allow an accurate electrochemical reaction to occur.

In the case of the existing vanadium electrolyte, it is general to dissolve vanadium oxide such as $V_2O_5$, $VOSO_4$, or $V_2(SO_4)_3$ in acid such as sulfuric acid, hydrochloric acid, phosphoric acid, or nitric acid, and then allow the vanadium electrolyte to have a predetermined oxidation number by using a reducing agent. In order to prepare a vanadium electrolyte having an accurate oxidation number, a method of using a stack is used.

For example, when a vanadium electrolyte having an oxidation number of +4 is supplied to a positive electrode and a negative electrode of the stack and charging is conducted to 100% state of charge (SOC), a positive electrolyte has an oxidation number of +5 and a negative electrolyte has an oxidation number of +3 through an electrochemical reaction. Here, in order to allow charging and discharging to occur, the positive electrolyte having an oxidation number of +5 is discharged from the stack and reduced to a vanadium electrolyte having an oxidation number of +4 by using a reducing agent, so that a positive electrolyte in the +4 oxidation state and a negative electrolyte in the +3 oxidation state based on a complete discharge state can be obtained. The preparing method using the stack is advantageous in preparing an electrolyte having an accurate oxidation number, but the stack material may be damaged as the charging and discharging reaction proceeds, and the preparing time may be increased, causing a rise in preparation cost.

Further, a method of preparing a positive electrolyte and a negative electrolyte by using a reducing agent does not use the stack, resulting in a decrease in preparation cost, but since it is difficult to obtain an electrolyte having an accurate oxidation number through only a chemical reaction, the performance of the electrolyte may be deteriorated. Further, the accuracy of oxidation number is improved by applying an oxidation number checking method, but the oxidation number checking method is considerably cumbersome since the oxidation number is determined by taking the sample and then feeding a reagent, which is color-changeable at a specific oxidation number, thereto to measure the color change; the time for preparing, such as sampling and checking of the color change reaction, is increased; and a preparing process for purification needs to be added to reuse the checked sample.

Japanese Patent Laid-Open Publication no. 2004-71165 (published: 2004 Mar. 4, hereinafter, 'publication patent') discloses a method for preparing an electrolyte for a vanadium redox battery. Here, a vanadium-sulfuric acid solution in which vanadium having an oxidation number of +4 or higher is dissolved in sulfuric acid is used as a negative electrolyte and an aqueous solution containing sulfuric acid or a vanadium-sulfuric acid solution is used as a positive electrolyte. Then, the negative electrolyte is reduced by an electrolytic reduction apparatus until the negative electrolyte has an oxidation-reduction potential of 100~400 mV, so that vanadium having an oxidation number of +3.5 is obtained. The foregoing method of the publication patent has an advantage of preparing a vanadium electrolyte having an oxidation number of +3.5, commonly usable as the negative electrolyte and the positive electrolyte. However, since the negative electrode and the positive electrode are respectively put in the positive electrolyte and the negative electrolyte to obtain an electrolyte having an oxidation number of +3.5 by a reducing procedure through electrolysis, the stack material may be damaged during the electrolysis. Moreover, although the preparing time may be partially decreased, the preparation procedure still takes a long time since the electrolytic reduction procedure is conducted to a desired oxidation number.

SUMMARY OF THE INVENTION

Accordingly, the present invention has been made to solve the above-mentioned problems occurring in the prior art, and an aspect of the present invention is to provide a method for preparing a vanadium electrolyte in the +3.5 oxidation state in which vanadium in the +3 oxidation state ($V^{3+}$) and vanadium in the +4 oxidation state ($V^{4+}$) are mixed in the same proportions, capable of being used for both a negative electrode and a positive electrode of a vanadium redox flow battery, even without an electrolysis procedure.

Further, another aspect of the present invention is to provide a method for preparing a vanadium electrolyte, capable of rapidly adjusting the oxidation number of the mixed electrolyte to be +3.5 and thus shortening the preparing time, by measuring the voltage between a reference electrolyte having an oxidation number of +3.5 and a mixed electrolyte in which two vanadium electrolytes having different oxidation numbers are mixed, to thereby correct the mixing amounts thereof in real time.

In order to accomplish this object, there is provided a method for preparing an electrolyte for a vanadium redox flow battery by mixing two vanadium electrolytes having different oxidation numbers, the electrolyte having an oxidation number of +3.5 and being usable for both a positive electrode and a negative electrode, the method including: conducting a first electrolyte preparing procedure of mixing vanadium oxide and an acidic solution to prepare a vanadium electrolyte having an oxidation number range of +3.5 to +5, as a first electrolyte; conducting a second electrolyte preparing procedure of mixing vanadium oxide and an acidic solution to prepare a vanadium electrolyte having an oxidation number range of +2 to +3.5, as a second electrolyte; conducting a mixed electrolyte preparing procedure of mixing the first electrolyte and the second electrolyte prepared by the first electrolyte preparing procedure and the second electrolyte preparing procedure to prepare a mixed electrolyte; conducting a mixed electrolyte supplying procedure of supplying the prepared mixed electrolyte to a positive electrode and a negative electrode of a stack; and conducting a positive electrolyte and negative electrolyte separating procedure of separating a positive electrolyte and a negative electrolyte from each other by supplying electric energy to the stack.

The method may further include: after the mixed electrolyte preparing procedure, conducting a mixed electrolyte oxidation number checking procedure of checking the oxidation number of the mixed electrolyte by comparing the mixed electrolyte with a reference electrolyte having a median oxidation number of the first and second electrolytes used as the positive electrolyte and the negative electrolyte of the vanadium redox flow battery; and, before the mixed electrolyte supplying procedure, conducting an oxidation number matching procedure of further adding the first electrolyte or the second electrolyte until the oxidation number of the mixed electrolyte, checked in the mixed electrolyte oxidation number checking procedure, is the same as the oxidation number of the reference electrolyte, the mixed electrolyte having the same oxidation number as the reference electrolyte being supplied to the stack in the mixed electrolyte supplying procedure.

Here, in the mixed electrolyte preparing procedure, the first electrolyte prepared by the first electrolyte preparing procedure and the second electrolyte prepared by the second electrolyte preparing procedure may be mixed at a mixture ratio determined depending on effective oxidation numbers of the first electrolyte and the second electrolyte.

Here, in the mixed electrolyte preparing procedure, the mixture ratio of the first electrolyte and the second electrolyte may be determined by equation 1 below:

$$\text{First electrolyte:Second electrolyte} = |X_2 - A| : |X_1 - A| \quad \text{[Equation 1]}$$

$X_1$: effective oxidation number of first electrolyte
$X_2$: effective oxidation number of second electrolyte
A: median oxidation number of two electrolytes used in positive electrode and negative electrode.

Here, in the mixed electrolyte oxidation number checking procedure, the checking of the oxidation number may be conducted by: supplying the reference electrolyte having the median oxidation number to one electrode of the vanadium redox flow battery unit cell, and supplying the mixed electrolyte having an unknown oxidation number to the other electrode of the unit cell; and measuring an open circuit voltage (OCV) between the reference electrolyte and the mixed electrolyte and determining whether or not the mixed electrolyte and the reference electrolyte have the same oxidation number based on whether or not the open circuit voltage is 0 V.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, the present invention will be described in detail with reference to the accompanying drawings. However, the accompanying drawings are given for easily illustrating contents and scopes of technical spirits of the present invention and are not to be construed as limiting or changing the scope of the invention. In addition, based on these illustrations, those skilled in the art will appreciate that various modifications may be made to the present invention without departing from the scopes of the present invention.

As for a method for preparing an electrolyte for a vanadium redox flow battery using vanadium oxide according to the present invention, two vanadium electrolytes having different oxidation numbers are mixed to prepare an electrolyte for a vanadium redox flow battery (VRFB), capable of being used in both a positive electrode and a negative electrode. That is, in the vanadium redox flow battery, the oxidation number varies between +4 and +5 while charging and discharging occurs at the positive electrode, and the oxidation number varies between +3 and +2 while charging and discharging occurs at the negative electrode. Therefore, based on the discharge state, electrolytes having oxidation numbers of +4 and +5 are supplied as the positive electrolyte and the negative electrolyte, and here, since electron movement occurs in a 1:1 correspondence manner in the positive electrolyte and the negative electrolyte, the same amounts of positive electrolyte and the negative electrolyte need to be supplied to obtain the maximum effect based on capacitance.

For example, when the positive electrolyte having an oxidation number of +4 and the negative electrolyte having an oxidation number of +3 are supplied in the same amounts, the oxidation number of the electrolyte supplied to the vanadium redox flow battery is theoretically +3.5. Therefore, in the case where the electrolyte is prepared to have an oxidation number of +3.5, vanadium having an oxidation number of +3 and vanadium having an oxidation number of +4 are mixed in the same amounts and are separated from each other as the positive electrolyte and the negative electrolyte through charging, and afterward, charging and discharging can be continuously conducted. Therefore, the present invention provides a method for preparing an electrolyte having an oxidation number of +3.5 as precisely and rapidly as possible.

Figure 1:
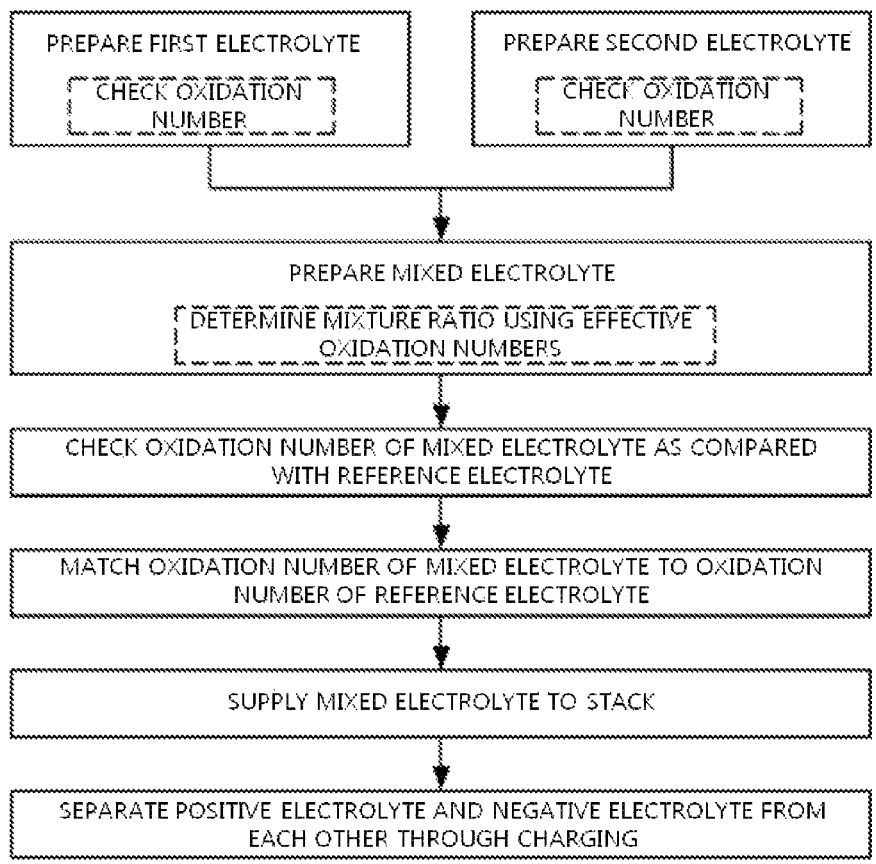
FIG. 1 is a process flowchart illustrating a method for preparing an electrolyte for a vanadium redox flow battery according to an embodiment of the present invention.

FIG. 1 is a process flowchart illustrating a method for preparing an electrolyte for a vanadium redox flow battery according to an embodiment of the present invention.

As shown in FIG. 1, with respect to a method for preparing an electrolyte of the present invention, a first electrolyte preparing procedure is conducted such that a first electrolyte is prepared. In the first electrolyte preparing procedure, an electrolyte used in a positive electrode of a vanadium redox flow battery is prepared. The first electrolyte is prepared to have an oxidation number range of +3.5 ($V^{3.5+}$) to +5 ($V^{5+}$) by mixing vanadium oxide and an acidic solution.

Although the first electrolyte may be prepared to have an oxidation number of +3.5 to +5, which is an oxidation number conversion range of vanadium used as a positive electrolyte, the first electrolyte preferably has an oxidation number of +4, corresponding to vanadium for the positive electrode based on a discharge state.

Vanadium oxide used in preparing the first electrolyte may be one selected from $V_2O_5$ and $VOSO_4$, and the acidic solution may be used by one or a mixture of two or more selected from the group consisting of sulfuric acid, hydrochloric acid, phosphoric acid, and nitric acid. In addition, the oxidation number may be controlled by using one selected from ethanol, methanol, and an oxalic acid, as a reducing agent. For example, at the time of preparing the first electrolyte, the oxidation number may be controlled to be a range of +3 to +5 or preferably +4, when $V_2O_5$ having an oxidation number of +5 is used as vanadium oxide. Besides the foregoing material, various materials capable of reducing the oxygen group of vanadium oxide may be used as the reducing agent. Generally, it is preferable to use a material having a standard reduction potential of +1.23 V or lower. In addition, it is preferable that the vanadium oxide and the acidic solution are used in the concentration range of 0.1~10 M, but may be used in the same concentrations for easy mixing thereof.

Then, a second electrolyte preparing procedure is conducted such that a second electrolyte is prepared. In the second electrolyte preparing procedure, an electrolyte used in a negative electrode of the vanadium redox flow battery is prepared. The second electrolyte is prepared to have an oxidation number range of +2 ($V^{2+}$) to +3.5 ($V^{3.5+}$) by mixing vanadium oxide and an acidic solution.

Here, the second electrolyte may be prepared to have an oxidation number of +2 to +3.5, which is an oxidation number conversion range of vanadium used for a negative electrolyte, but the second electrolyte preferably has an oxidation number of +3, corresponding to vanadium for negative electrode based on a discharge state.

The vanadium oxide used in preparing the second electrolyte may be one selected from a mixture of $VOSO_4$ and $V_2(SO_4)_3$ and a mixture obtained by reducing $V_2O_5$ or $VOSO_4$ using a reducing agent. In addition, the acidic solution may be used by one or a mixture of two or more selected from the group consisting of sulfuric acid, hydrochloric acid, phosphoric acid, and nitric acid. The oxidation number may be controlled by using one selected from ethanol, methanol, and an oxalic acid, as a reducing agent. For example, the second electrolyte is prepared by using, as vanadium oxide, a mixture of $VOSO_4$ having an oxidation number of +4 and $V_2(SO_4)_3$ having an oxidation number of +3, or a mixture in which the oxidation number of $V_2O_5$ (+5) or $VOSO_4$ (+4) is controlled to be +2 to +3.5, preferably +3, through a reducing agent.

The first electrolyte preparing procedure and the second electrolyte preparing procedure include a first electrolyte oxidation number checking procedure and a second electrolyte oxidation number checking procedure, respectively, which are conducted to verify whether or not an electrolyte having a desired oxidation number is prepared.

In the first electrolyte oxidation number checking procedure, the open circuit voltage (OCV) difference between the prepared first electrolyte and a reference electrolyte is measured by using a unit cell for a vanadium redox flow battery, and suitability of the first electrolyte is evaluated based on the voltage difference.

Figure 2:
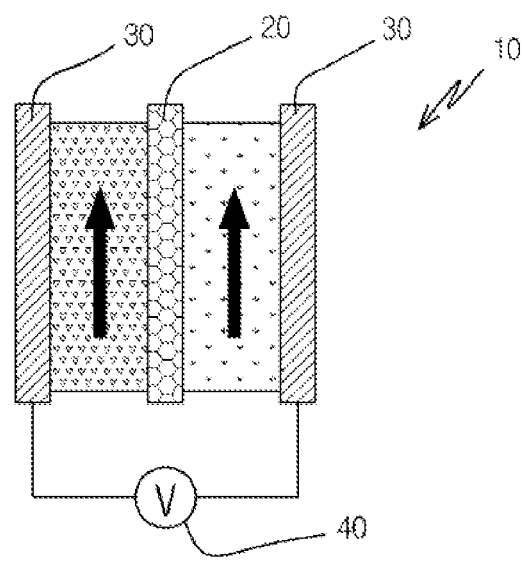
FIG. 2 is a schematic view showing a unit cell of a vanadium redox flow battery measuring an open circuit voltage according to an embodiment of the present invention.

Referring to FIG. 2, a vanadium redox flow battery unit cell 10 has a constitution in which a space between two separators 30 is divided by a membrane 20 and the two separators 30 are connected to a voltage meter 40. A reference electrolyte is supplied into one space defined by the membrane 20, as one electrode of the unit cell 10. The reference electrolyte has an oxidation number, which the first electrolyte needs to have, for example, +4. The first electrolyte prepared by the first electrolyte procedure is supplied into the other space defined by the membrane 20, as the other electrode of the unit cell 10. Here, the open circuit voltage between the reference electrolyte and the first electrolyte is measured by using the voltage meter 40, and thus it is verified whether the open circuit voltage is 0 V. That is, if both the electrolytes have the same oxidation number without a potential difference, the measured voltage is 0 V, and if both the electrolytes have different oxidation numbers, the measured voltage is greater 0 V due to a potential difference.

Since the open circuit voltage between the reference electrolyte and the first electrolyte is measured in real time, an acidic solution in which vanadium oxide is dissolved is fed or a reducing agent is fed such that the open circuit voltage is 0 V, in real time, and thus an electrolyte having the same oxidation number as the reference electrolyte can be prepared.

According to this checking method, the oxidation number is immediately measured by establishing, as the reference electrolyte, an electrolyte having an oxidation number of +4 or an electrolyte having an oxidation number of +3, and then allowing the first electrolyte or the second electrolyte prepared by the first electrolyte preparing procedure or the second electrolyte preparing procedure to circulate the unit cell, and then, when necessary, the acidic solution in which vanadium oxide is dissolved or the reducing agent is fed to thereby immediately change the oxidation number, so that a desired oxidation number of the reference electrolyte can be easily established.

Then, a mixed electrolyte preparing procedure is conducted such that the first electrolyte and the second electrolyte prepared by the first electrolyte preparing procedure and the second electrolyte preparing procedure are mixed to prepare a mixed electrolyte.

Although the first electrolyte and the second electrolyte are mixed at various mixture ratios, they may be mixed to have a median oxidation number of two electrolytes, with a result that the oxidation number of the mixed electrolyte can be easily and precisely controlled during an oxidation number matching procedure, which is a subsequent process.

Therefore, the mixed electrolyte preparing procedure may include a procedure of determining a mixture ratio of the first electrolyte and the second electrolyte depending on effective oxidation numbers of the first electrolyte and the second electrolyte such that the mixed electrolyte has an oxidation number closer to the median oxidation number of the first and second electrolytes through the mixture ratio. The effective oxidation number means the oxidation number of vanadium involved in electron donation in the fed vanadium oxide. In addition, the calculation of the mixture ratio using the effective oxidation number is conducted by [equation 1] below:

$$\text{First electrolyte:Second electrolyte} = |X_2 - A| : |X_1 - A| \quad \text{[Equation 1]}$$

$X_1$: effective oxidation number of first electrolyte
$X_2$: effective oxidation number of second electrolyte
A: median oxidation number of two electrolytes used in positive electrode and negative electrode Here, values of $X_1 - A$ and $X_2 - A$ are calculated in terms of the absolute value.

For example, as a preferable embodiment of the present invention, since the first electrolyte has an oxidation number of +4 and the second electrolyte has an oxidation number of +3, the effective oxidation number of the first electrolyte is +4 and the effective oxidation number of the second electrolyte is +3, and thus the median oxidation number of the positive electrolyte and the negative electrolyte, which is to be used in the present invention, is +3.5.

The calculation of equation 1 is as follows:

$$|X_2 - A| : |X_1 - A| = |3 - 3.5| : |4 - 3.5| = 0.5 : 0.5.$$

It may be seen that the first electrolyte and the second electrolyte are mixed in the same proportions, at a ratio of 1:1 while the values are calculated in terms of a positive number.

In the present embodiment, the oxidation number in the simple mixture is calculated. However, even though a plural of oxide materials are mixed, the mixture ratio is determined by simple calculation using only effective oxidation numbers and then the mixing is conducted based on the mixture ratio, so that a mixed electrolyte having an oxidation number similar to the median oxidation number of the negative electrolyte and the positive electrolyte can be prepared.

Then, a mixed electrolyte oxidation number checking procedure is conducted such that the oxidation number of the mixed electrolyte is checked by comparing the mixed electrolyte prepared by the mixed electrolyte preparing procedure with a reference electrolyte having a median oxidation number of the two electrolytes used in the positive electrode and the negative electrode of the vanadium redox flow battery.

In the present invention, the checking is conducted by using a positive electrolyte of which the oxidation number varies in the range between +4 and +5 during the charging and discharging and a negative electrolyte of which the oxidation number varies in the range between +2 and +3, as electrolytes used in the vanadium redox flow battery, the median oxidation number of the two electrolytes being +3.5 when a positive electrolyte having an oxidation number of +4 and a negative electrolyte having an oxidation number of +3 are used, based on a discharge state, and using, as a reference electrolyte, an electrolyte prepared by mixing the positive electrolyte having an oxidation number of +4 and the negative electrolyte having an oxidation number of +3 in the same amounts to have an accurate median oxidation number.

In the checking of the oxidation number, the vanadium redox flow battery unit cell is used as described above. The open circuit voltage between the reference electrolyte and the mixed electrolyte is measured by supplying the reference electrolyte to one electrode of the unit cell and allowing the mixed electrolyte having an unknown oxidation number to pass through the other electrode.

When the measured open circuit voltage is 0 V, it means that there is not a potential difference between the reference electrolyte and the mixed electrolyte and thus the oxidation numbers thereof are the same as each other. When the measured open circuit voltage is not 0 V, it means that there is a potential difference between the reference electrolyte and the mixed electrolyte and thus the oxidation numbers thereof are different.

Then, an oxidation number matching procedure is conducted. In this procedure, the first electrolyte or the second electrolyte is further added so that the open circuit voltage measured during the mixed electrolyte oxidation number checking procedure becomes 0 V to thereby allow the oxidation number of the mixed electrolyte to match that of the reference electrolyte.

That is, if the open circuit voltage measured is 0 V in the mixed electrolyte oxidation number checking procedure, the oxidation number matching procedure need not be conducted. The oxidation number matching procedure is conducted only when the open circuit voltage is not 0 V.

In the present invention, the open circuit voltage can be measured in real time since the first electrolyte or the second electrolyte circulates the unit cell while being further added. In the case where the first electrolyte or the second electrolyte is erroneously input in the process of adjusting the open circuit voltage to 0 V, the open circuit voltage is greater. In this case, the mixing is immediately stopped and another electrolyte is supplied, so that an electrolyte having an accurate oxidation number can be prepared.

In addition, it is preferable that the open circuit voltage between the mixed electrolyte and the reference electrolyte is adjusted to just 0 V, but considering that the oxidation number of vanadium is not fixed to any value and there is a small change in the oxidation number due to electron movement, the open circuit voltage is set to an allowable range of 0 V to 0.2 V so that the oxidation number of the mixed electrolyte can be as similar as possible to the median oxidation number.

The mixed electrolyte obtained when the open circuit voltage between the reference electrolyte and the mixed electrolyte is 0 V or closer to 0 V through the oxidation number matching procedure has an oxidation number the same as or similar to +3.5, and it may be seen that, in the case where the electrolytes having oxidation numbers of +3 and +4 are used like in the present invention, the electrolyte having an oxidation number of +3 and the electrolyte having an oxidation number of +4 are mixed in the same amounts.

In addition, in the oxidation matching procedure, electrolytes having different oxidation numbers are mixed to prepare an electrolyte having a median oxidation number without separate charging and discharging, and thus, the lifetime of the unit cell or a part such as a member for mixing electrolytes is prevented from being shortened, leading to the use for a long time.

In addition, the mixed electrolyte oxidation number checking procedure and the oxidation number matching procedure are conducted to precisely match the oxidation number of the mixed electrolyte and the oxidation number of the reference electrolyte. These procedures may be omitted before a mixed electrolyte-to-stack supplying procedure, which will be later described.

Then, the mixed electrolyte-to-stack supplying procedure is conducted such that the mixed electrolyte having the same oxidation number as the reference electrolyte through the mixed electrolyte oxidation number checking procedure and the oxidation number matching procedure or the mixed electrolyte not subjected to the mixed electrolyte oxidation number checking procedure and the oxidation number matching procedure is supplied to a stack of the vanadium redox flow battery.

The mixed electrolyte of this procedure has a median oxidation number of positive and negative electrolytes to be used. For example, as the mixed electrolyte has an oxidation number of +3.5 by mixing the positive electrolyte with an oxidation number of +4 and the negative electrolyte with an oxidation number of +3 in the same amounts, the mixed electrolyte subjected to the mixed electrolyte oxidation number checking procedure or the oxidation number matching procedure is supplied to the positive electrode and the negative electrode of the stack of the vanadium redox flow battery.

Then, a positive electrolyte and negative electrolyte separating procedure is conducted. This procedure is conducted such that the positive electrolyte and the negative electrolyte are separated from each other by charging the stack in which the mixed electrolyte is supplied, the mixed electrolyte having the positive electrolyte and the negative electrolyte mixed in the same amounts.

Since the positive electrolyte and the negative electrolyte are separated from each other by charging the mixed electrolyte having the positive electrolyte and the negative electrolyte mixed in the same amounts, the same amounts of positive electrolyte and negative electrolyte capable of being charged and discharged can be obtained without an additional procedure, and since the same amounts of positive electrolyte and the negative electrolyte are separated from each other, the charging and discharging effect based on the capacitance can be maximized.

Hereinafter, the method for preparing an electrolyte according to the present invention will be briefly described.

1M $VOSO_4$ was dissolved in an aqueous 1M sulfuric acid solution to prepare a first electrolyte having an oxidation number of +4 in a reactor.

1M $VOSO_4$ was dissolved in an aqueous 1M sulfuric acid solution, followed by using a reducing agent, oxalic acid, to prepare a second electrolyte having an oxidation number of +3 in a reactor.

The mixture ratio of the first electrolyte and the second electrolyte was calculated according to the effective oxidation numbers thereof.

First electrolyte:Second electrolyte=$|X_2-A|:|X_1-A|$ $X_1$: effective oxidation number of first electrolyte
$X_2$: effective oxidation number of second electrolyte
A: median oxidation number of two electrolytes used in positive electrode and negative electrode The differences between the oxidation number and the median oxidation numbers were calculated in terms of a positive number. As a result of calculation, the first electrolyte and the second electrolyte need to be mixed in the same amounts.

Thus, the mixed electrolyte was prepared by mixing the same amounts of first electrolyte and the second electrolyte.

The potential difference of the prepared mixed electrolyte from the reference electrolyte was measured by using a vanadium redox flow battery unit cell. That is, as the reference electrolyte, an electrolyte verified to have an oxidation number of +3, which is a median oxidation number of the positive electrolyte and the negative electrolyte, was used. In addition, the open circuit voltage between the reference electrolyte and the mixed electrolyte was measured and then it was verified whether the measured open circuit voltage is 0 V. In addition, the first electrolyte or the second electrolyte was further added to adjust the mixture ratio such that the measured open circuit voltage is 0 V, to thereby allow the oxidation numbers thereof to match each other.

The mixed electrolyte obtained when the open circuit voltage between the reference electrolyte and the mixed electrolyte was 0 V was supplied to the positive electrode and the negative electrode of the stack of the vanadium redox flow battery. Then, when electricity was applied to the stack, the mixed electrolyte having a median oxidation number was separated into the same amounts of positive electrolyte and the negative electrolyte, and afterward, continuous charging and discharging occurs without an additional procedure.

As set forth above, according to the method for preparing an electrolyte for a vanadium redox flow battery, one electrolyte can be used as both the positive electrolyte and the negative electrolyte, by preparing an electrolyte having a median oxidation number of electrolytes used for the positive electrode and the negative electrode of the vanadium redox flow battery. Particularly, since the mixed electrolyte having the median oxidation number is separated into the same amounts of positive electrolyte and the negative electrolyte at the time of charging and discharging, the maximum charging and discharging effect based on the supplied capacitance can be obtained.

Further, at the time of preparing the mixed electrolyte, the first electrolyte and the second electrolyte are mixed according to the mixing amounts of the first and second electrolytes, which is calculated by using effective oxidation numbers of the first and second electrolytes, to allow the mixed electrolyte to have an oxidation number similar to the median oxidation number, and then, while the open circuit voltage between the mixed electrolyte and the reference electrolyte having a median oxidation number is measured and confirmed in real-time, the first electrolyte or the second electrolyte was further added thereto, so that the mixing amounts of the first electrolyte and the second electrolyte are controlled to allow the mixed electrolyte to have the same oxidation number as the reference electrolyte in real time.

Therefore, while the mixed electrolyte is discharged and circulated, the oxidation number thereof can be measured and the first or second electrolyte is further added in real time, without a reducing procedure by an electrolysis using separate expensive electrodes or a process of feeding a reagent for inducing color conversion depending on the oxidation number of the taken sample during an oxidation number checking procedure, so that a large amount of electrolyte having an accurate oxidation number can be prepared for a short time.

Therefore, the manufacture cost of batteries can be significantly reduced and a large-capacity energy storage system (ESS) being recently in the limelight can be put to practical use and distributed in an accelerative manner.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for preparing an electrolyte for a vanadium redox flow battery by mixing two vanadium electrolytes having different oxidation numbers, the electrolyte having an oxidation number of +3.5 and being usable for both a positive electrode and a negative electrode, the method comprising:

conducting a first electrolyte preparing procedure of mixing vanadium oxide and an acidic solution to prepare a vanadium electrolyte having an oxidation number range of +3.5 to +5, as a first electrolyte;

conducting a second electrolyte preparing procedure of mixing vanadium oxide and an acidic solution to prepare a vanadium electrolyte having an oxidation number range of +2 to +3.5, as a second electrolyte;

conducting a mixed electrolyte preparing procedure of mixing the first electrolyte and the second electrolyte prepared by the first electrolyte preparing procedure and the second electrolyte procedure to prepare a mixed electrolyte;

conducting a mixed electrolyte supplying procedure of supplying the prepared mixed electrolyte to a positive electrode and a negative electrode of a stack; conducting a positive electrolyte and negative electrolyte separating procedure of separating a positive electrolyte and a negative electrolyte from each other by supplying electric energy to the stack, further comprising after the mixed electrolyte preparing procedure, conducting a mixed electrolyte oxidation number checking procedure of checking the oxidation number of the mixed electrolyte by comparing the mixed electrolyte with a reference electrolyte having a median oxidation number of the first and second electrolytes used as the positive electrolyte and the negative electrolyte of the vanadium redox flow battery; and before the mixed electrolyte supplying procedure, conducting an oxidation number matching procedure of further adding the first electrolyte or the second electrolyte until the oxidation number of the mixed electrolyte, checked in the mixed electrolyte oxidation number checking procedure, is the same as the oxidation number of the reference electrolyte, the mixed electrolyte having the same oxidation number as the reference electrolyte being supplied to the stack in the mixed electrolyte supplying procedure.

2. The method of claim 1, wherein, in the mixed electrolyte oxidation number checking procedure, the checking of the oxidation number is conducted by:

supplying the reference electrolyte having the median oxidation number to one electrode of the vanadium redox flow battery unit cell, and supplying the mixed electrolyte having an unknown oxidation number to the other electrode of the unit cell; and measuring an open circuit voltage (OCV) between the reference electrolyte and the mixed electrolyte and determining whether or not the mixed electrolyte and the reference electrolyte have the same oxidation number based on whether or not the open circuit voltage is 0 V.

3. The method of claim 1, wherein the first electrolyte by the first electrolyte preparing procedure has an oxidation number of +4 and the second electrolyte by the second electrolyte preparing procedure has an oxidation number of +3, and thus the reference electrolyte in the mixed electrolyte oxidation number checking procedure has an oxidation number of +3.5.

4. The method of claim 1, wherein the vanadium oxide used in the first electrolyte preparing procedure is one selected from $V_2O_5$ and $VOSO_4$; and wherein the vanadium oxide used in the second electrolyte preparing procedure is one selected from a mixture of $VOSO_4$ and $V_2(SO_4)_3$ and a mixture obtained by reducing $V_2O_5$ or $VOSO_4$ using a reducing agent.

5. The method of claim 4, wherein the reducing agent is one selected from the group consisting of ethanol, methanol, and oxalic acid.

6. The method of claim 1, wherein the acidic solution is one selected from the group consisting of sulfuric acid, hydrochloric acid, phosphoric acid, and nitric acid.

7. The method of claim 1, wherein the first electrolyte preparing procedure and the second electrolyte preparing procedure, respectively, include a first electrolyte oxidation number checking procedure and a second electrolyte oxidation number checking procedure of each verifying whether an electrolyte having a set oxidation number is prepared.

8. The method of claim 7, wherein the first or second electrolyte oxidation number checking procedure comprises:

supplying the reference electrolyte to one electrode of the vanadium redox flow battery unit cell, the reference electrolyte having the same oxidation number as the first or second electrolyte, and supplying the vanadium electrolyte having an unknown oxidation number to the other electrode thereof, the vanadium electrolyte being obtained by mixing the vanadium oxide and the acidic solution in the first or second electrolyte preparing procedure; and measuring an open circuit voltage (OCV) between the first and second electrolytes and determining whether or not the oxidation number of the vanadium electrolyte is the same as that of the reference electrolyte, based on whether or not the open circuit voltage is 0 V.

9. The method of claim 1, wherein the first electrolyte and the second electrolyte have effective oxidation numbers, and wherein in the mixed electrolyte preparing procedure, the first electrolyte prepared by the first electrolyte preparing procedure and the second electrolyte prepared by the second electrolyte preparing procedure are mixed at a mixture ratio determined depending on effective oxidation numbers of the first electrolyte and the second electrolyte.

10. The method of claim 9, wherein in the mixed electrolyte preparing procedure, the mixture ratio of the first electrolyte and the second electrolyte is determined by equation 1 below:

$$\text{First electrolyte:Second electrolyte} = |X_2 - A| : |X_1 - A| \quad \text{[Equation 1]}$$

$X_1$: effective oxidation number of first electrolyte
$X_2$: effective oxidation number of second electrolyte
$A$: median oxidation number of two electrolytes used in positive electrode and negative electrode.

* * * * *